(12) United States Patent
Dunne

(10) Patent No.: US 7,450,282 B2
(45) Date of Patent: Nov. 11, 2008

(54) HIGH PRECISION OPTICAL SYSTEM AND BEAM PATHWAY DESIGN FOR A LASER-BASED DISTANCE MEASURING DEVICE

(75) Inventor: Jeremy G. Dunne, Highlands Ranch, CO (US)

(73) Assignees: Laser Technology, Inc., Centennial, CO (US); Kama-Tech (HK) Limited, Tsim Sha Tsui, Hong Kong (CN)

( * ) Notice: Subject to any disclaimer, the term of this patent is extended or adjusted under 35 U.S.C. 154(b) by 36 days.

(21) Appl. No.: 11/423,328

(22) Filed: Jun. 9, 2006

(65) Prior Publication Data

US 2006/0285233 A1   Dec. 21, 2006

Related U.S. Application Data

(60) Provisional application No. 60/691,049, filed on Jun. 16, 2005.

(51) Int. Cl.
*G03H 1/00* (2006.01)

(52) U.S. Cl. .................. 359/13; 359/399; 359/833; 359/412; 356/4.01; 356/5.02

(58) Field of Classification Search ............ 356/5.02, 356/4.01; 359/13, 833, 359, 399
See application file for complete search history.

(56) References Cited

U.S. PATENT DOCUMENTS

| | | | |
|---|---|---|---|
| 6,057,910 A * | 5/2000 | Dunne | 356/5.05 |
| 6,236,504 B1 | 5/2001 | Kao et al. | |
| 6,292,314 B1 | 9/2001 | Perger | |
| 6,344,894 B1 | 2/2002 | Liou | |
| 2002/0124452 A1 * | 9/2002 | Sammut | 42/122 |
| 2002/0140899 A1 * | 10/2002 | Blum et al. | 351/159 |
| 2004/0114068 A1 * | 6/2004 | Yu et al. | 349/65 |
| 2004/0184023 A1 * | 9/2004 | Kao | 356/4.01 |
| 2005/0275825 A1 * | 12/2005 | Ohtomo et al. | 356/4.04 |

* cited by examiner

*Primary Examiner*—Thomas H. Tarcza
*Assistant Examiner*—Timothy A Brainard
(74) *Attorney, Agent, or Firm*—William J. Kubida; Michael C. Martensen; Hogan & Hartson LLP

(57) ABSTRACT

A high precision, high performance optical system and beam pathway design for laser-based distance measuring, or range-finding, devices includes an etched, or etched and filled, aiming reticle in the image plane which does not require daytime use illumination, and only minimal auxiliary illumination during nighttime operation, thereby conserving available battery power. In a preferred embodiment, a low power consuming back-lit liquid crystal display provides high contrast distance or other operational information to a user superimposed upon a black-appearing field stop thereby further providing operational power savings.

23 Claims, 8 Drawing Sheets

HIGH PRECISION OPTICAL SYSTEM AND BEAM PATHWAY DESIGN FOR A LASER-BASED DISTANCE MEASURING DEVICE

CROSS-REFERENCE TO RELATED APPLICATION

This application claims the benefit of U.S. Provisional Application No. 60/691,049, filed Jun. 16, 2005, which is incorporated in its entirety herein by this reference.

BACKGROUND OF THE INVENTION

The present invention relates, in general, to the field of signal transmitting and receiving range-finding devices. More particularly, the present invention relates to a high precision, high performance optical system and beam pathway design for laser-based distance measuring, or range-finding, devices.

Representative implementations of optical pathways for various optical instruments, including laser-based rangefinders, are described in, for example, U.S. Pat. No. 6,236,504 issuing May 22, 2001 for "Method and Device for Adjusting Eye Range by Means of Displacements of Prisms and Ocular Lenses"; U.S. Pat. No. 6,292,314 issuing Sep. 18, 2001 for "Prism System for Image Inversion in a Visual Observation Beam Path"; and U.S. Pat. No. 6,344,894 issuing Feb. 5, 2002 for: "Optical Axis Adjusting Structure for a Range Finder". A design representing a decided improvement over those described in the afore-mentioned issued patents is disclosed in U.S. patent application Ser. No. 10/992,572 filed Aug. 20, 2004 for: "Efficient Optical System and Beam Pathway Design for Laser-Based Distance Measuring Device" assigned to Laser Technology, Inc., Englewood, Colo., and Kama-Tech (HK) Limited, Hong Kong, China assignees of the present invention, the disclosure of which is herein incorporated by this reference in its entirety.

While generally representative of the current state of the art in such designs, the afore-mentioned '504, '314, and '894 patents all describe systems of lenses and prisms which are relatively complex to implement, space inefficient, as well as costly to manufacture, assemble and align. Therefore, a need exists for a high precision, high performance optical system and beam pathway design for a laser-based range-finder which provides significant advantages over conventional designs while nevertheless providing an accurate foundation for a compact, professional range-finder having excellent beam transmission/reception and optical properties for use in surveying or other demanding range-finding applications.

SUMMARY OF THE INVENTION

Disclosed herein is a high precision, high performance optical system and beam pathway design for laser-based distance measuring, or range-finding, devices which includes an etched, or etched and filled, aiming reticle in the image plane which does not require daytime use illumination, and only minimal auxiliary illumination during nighttime operation, thereby conserving available battery power. In a preferred embodiment, a low power consuming back-lit liquid crystal display provides high contrast distance or other operational information to a user superimposed upon a black-appearing field stop thereby further providing operational power savings.

Particularly disclosed herein is a system for a beam transmitting and receiving instrument comprising a beam emitting device for producing an emitted beam along a first beam transmission path; a pentaprism for intercepting the emitted beam and producing a redirected beam for direction through a transmission aperture toward a target along a second beam transmission path; a visual path superimposed upon the second beam transmission path and at least a portion of the first beam transmission path for redirection by the pentaprism along a visual path crossing the second beam transmission path; and an at least partially reflective surface disposed in the visual path for providing a redirected visual path such that a visual image of the target is presented at a visual aperture of the instrument along the redirected visual path.

Also disclosed herein is a method for a beam transmitting and receiving instrument comprising emitting the beam toward a target along first and second non-collinear beam transmission paths; viewing the target along a visual path coincident with the second beam transmission path and at least a portion of the first beam transmission path, with the visual path additionally comprising a further visual path and redirected visual path; and superimposing a visual display upon a view of the target.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1A:
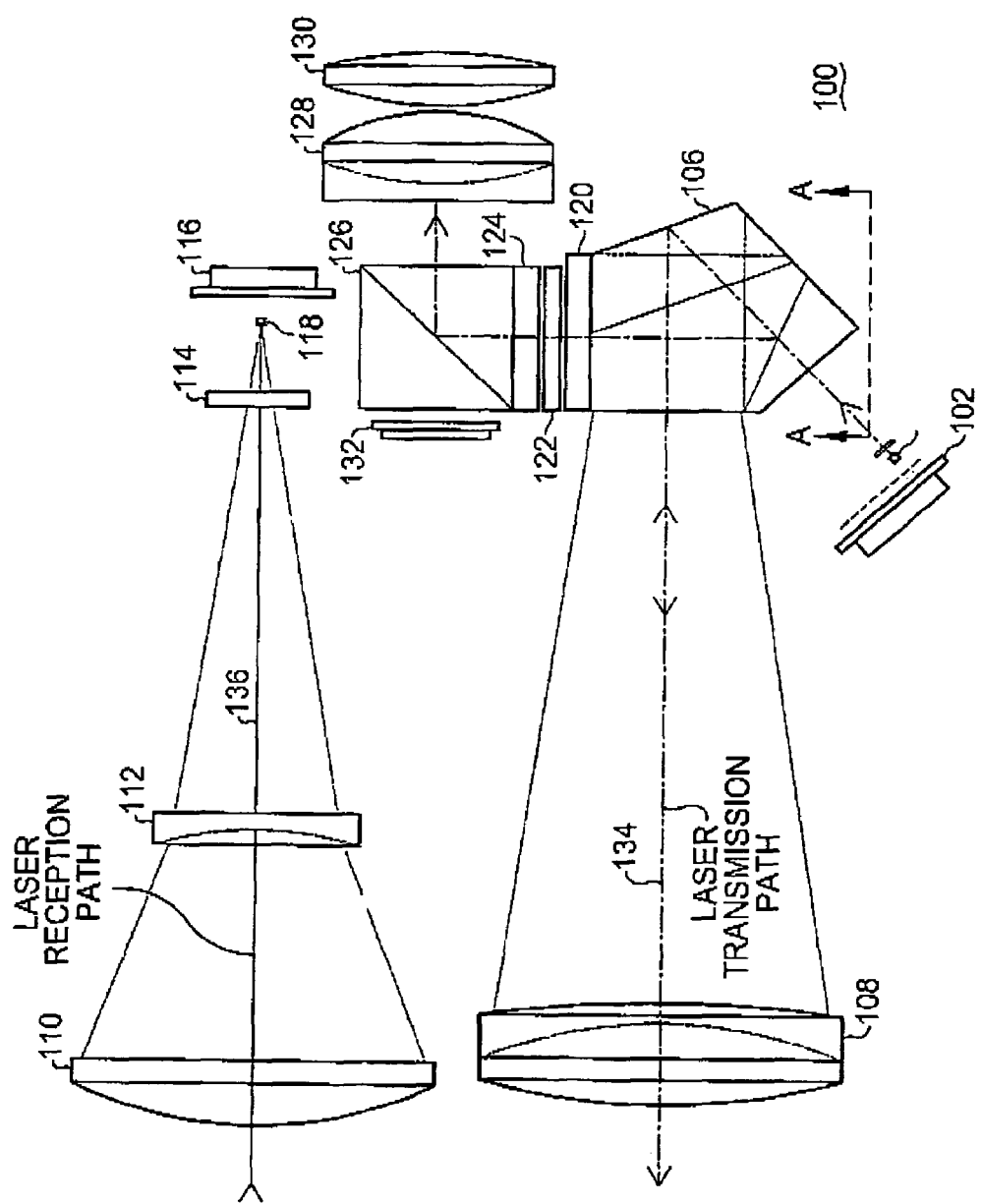
FIG. 1A is a simplified diagrammatic illustration of a representative embodiment of an optical system and beam pathway design in accordance with the present invention illustrating the beam transmission and reception paths thereof.

With reference now to FIG. 1A, a high precision, high performance optical system 100 and beam pathway design for a laser-based distance measuring device is shown with respect to the laser transmission and reception paths thereof in particular.

The system 100 comprises, in pertinent part, a laser transmission board 102 including a laser light emitting element 104. The laser light emitting element 104 projects a pulsed infrared laser beam toward an infrared (IR) dichroic roof pentaprism assembly 106 for redirection along a laser transmission path 134 through an objective lens 108 which collimates the laser beam towards the target.

The focal length of the laser transmission path 134 is, in a preferred embodiment of the present invention, substantially 45.0-50.0 mm while the focal length of the objective lens 108 is substantially between 10-15 mm.

Laser pulses reflected from a target are received by the system 100 as indicated by the laser reception path 136 passing through a first aspheric lens 110 and second lens 112. An aspheric lens is one having at least one face which is shaped to a surface of revolution about the lens axis, including conic sections except that of a sphere. Laser light received through the lenses 110 and 112 is intercepted by a filter 114 and is then incident upon a laser receiving diode or device 118 where the signals are amplified and processed by a receiver board 116. In the exemplary embodiment of the present invention illustrated, the focal length from the lens 110 to the laser receiving diode 118 is substantially 100.00 mm.

Figure 1B:
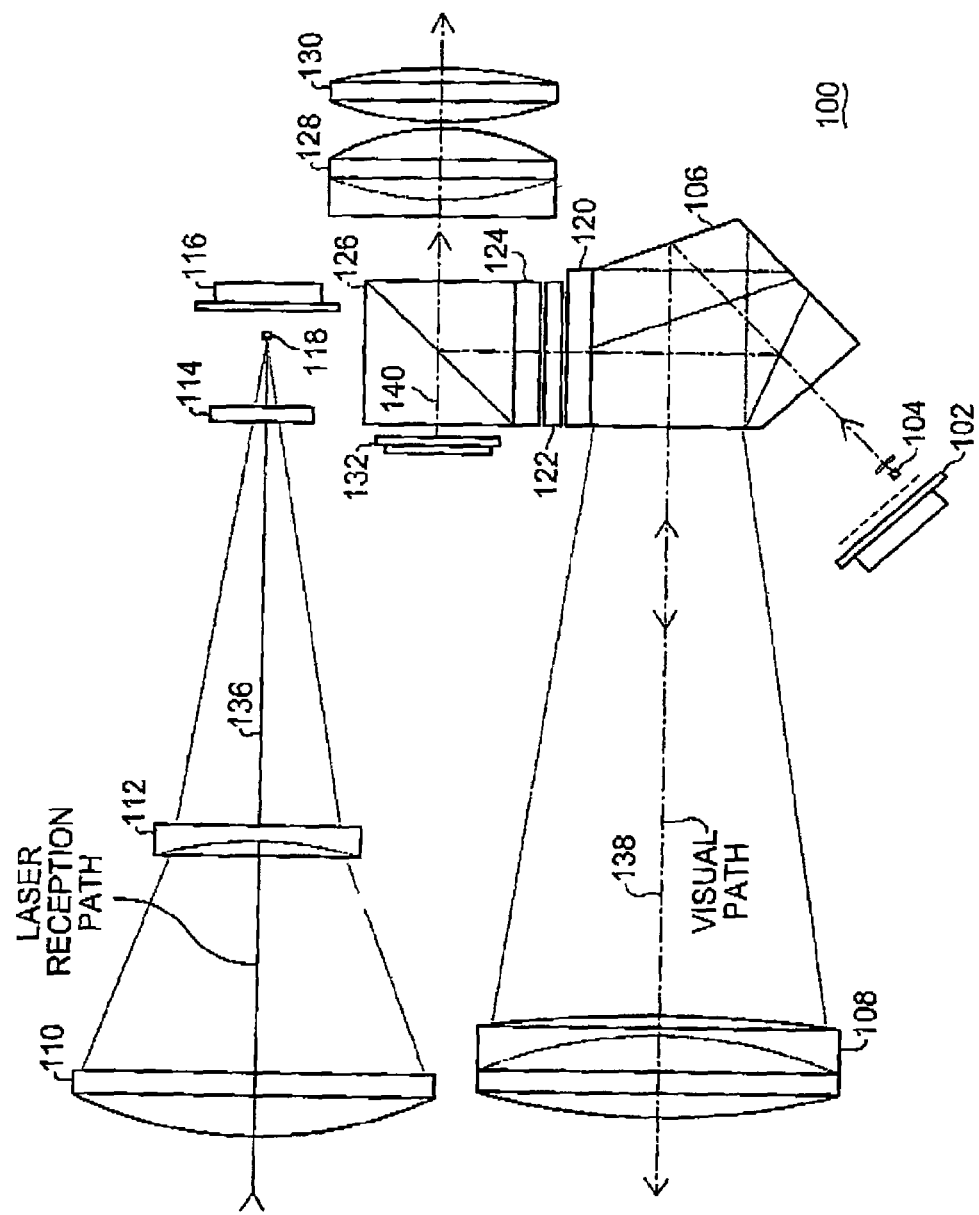
FIG. 1B is a corresponding diagrammatic illustration of the representative embodiment of the preceding figure illustrating, in particular, the visual path for the viewing of a target towards which a range-finding device incorporating the same may be aimed in conjunction with an aiming reticle and an in-sight head up display (HUD) coincident with the beam transmission path.

With reference additionally now to FIG. 1B, the system 100 of the preceding figure is shown with respect to the visual path 138 thereof in particular. Like structure to that previously illustrated and described is like numbered and the foregoing description thereof shall suffice herefor.

Visible light reflected from the target towards which the laser-based distance measuring device (or laser rangefinder) is aimed, as well as that of surrounding objects and terrain, enters the system 100 through lens 108 along visual path 138 as shown whereupon it impinges upon the pentaprism assembly 106. A pentaprism is a five-sided prism which typically has four optical faces, with one face that may be left unworked. The pentaprism assembly 106 allows an image to be transmitted through a right angle and image inversion is compensated for by means of a subsequent beam splitter cube as will be more fully described hereinafter.

The visual path 138 is internally reflected twice by the pentaprism assembly 106 to be presented at 90° to its initial path through a first reticle plate 120, aiming reticle and field stop plate 122 and second reticle plate 124. The aiming reticle and field stop plate 122 will be described in more detail hereafter, but it should be noted that the adjacent surfaces of the first and second reticle plates 120, 124 may also include an optional etched chrome field stop for purposes of minimizing edge illumination of the aiming reticle and field stop plate 122. In a representative embodiment, the aiming reticle may be etched on the surface adjoining the second reticle plate 124 and the gap between each of the plates 120, 122 and 124 may be substantially 0.25 mm.

Visible light received along the visual path 138 is then incident to an optically reflective surface of a beam splitter assembly 126 (comprising two prisms) which then reflects the incident light back to a viewer, or user, of the laser rangefinder embodying the system 100 through a series of lenses 128 and 130 as shown. In conjunction with visible light received along the visual path 138, a back-lit liquid crystal display (LCD) 132 can also be viewed along display path 140 superimposed upon the visual path 138. The particular implementation of an in-sight, head up display (HUD) for the system 100 utilizing an LCD display 132 will be more fully described hereinafter although it should be noted that a light emitting diode (LED), micro-LED or other informational display devices might be substituted instead.

It should be noted that in further alternative embodiments of the present invention, the visual path 138 may be coincident with the laser reception path 136 in lieu of the laser transmission path 134 without departing from the scope of the disclosure presented herein. In this regard, the positions of the light emitting element 104 and the light receiving diode or device 118 would be interchanged.

Figure 2:
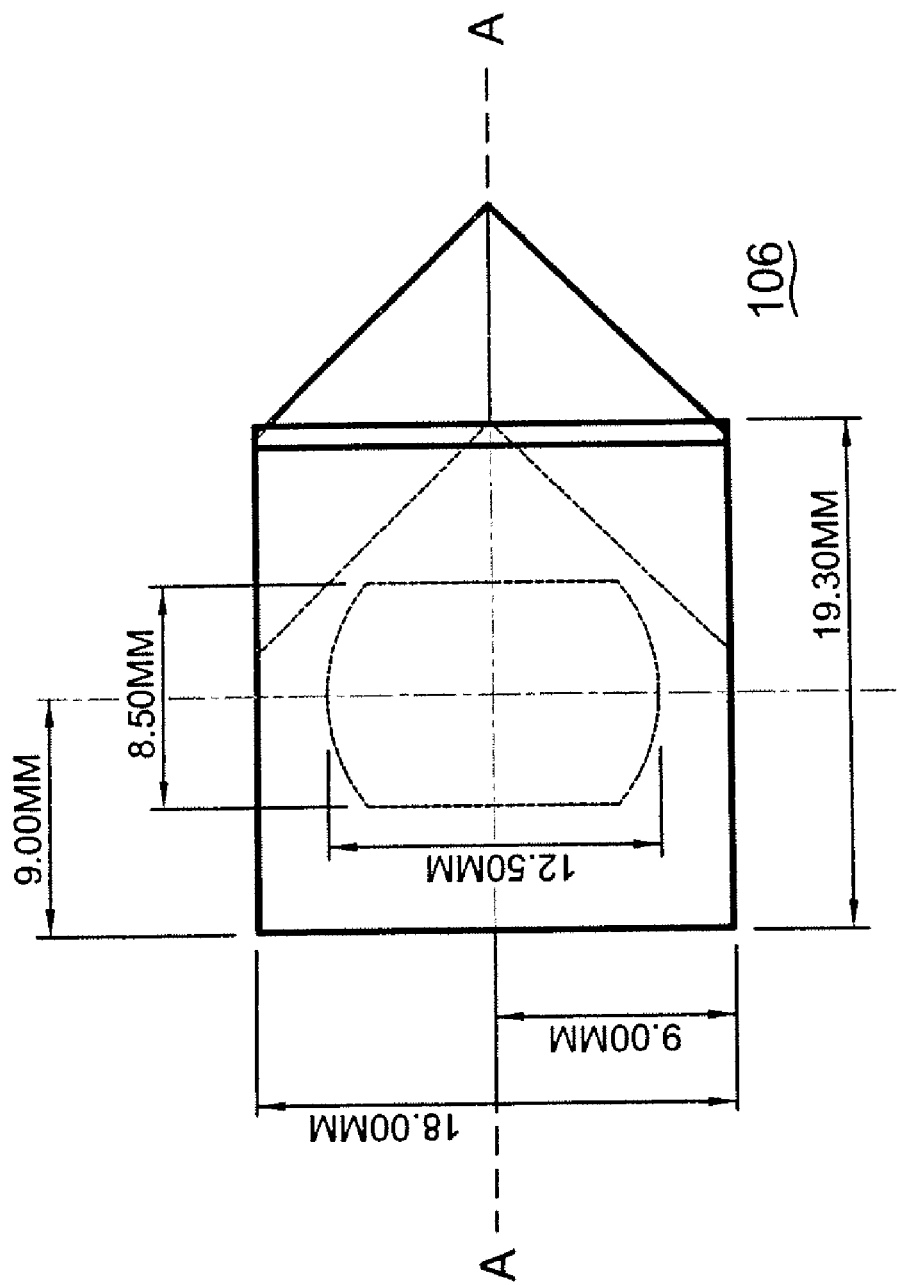
FIG. 2 illustrates, in greater detail, an end view and representative dimensions for the pentaprism depicted in the preceding figures taken substantially along section line A-A of FIG. 1A and illustrating the field stop position.

With reference additionally now to FIG. 2 an end view and representative dimensions for the pentaprism assembly 106 depicted in the preceding figures is shown taken substantially along section line A-A of FIG. 1A. The field stop position is also illustrated.

Figure 3:
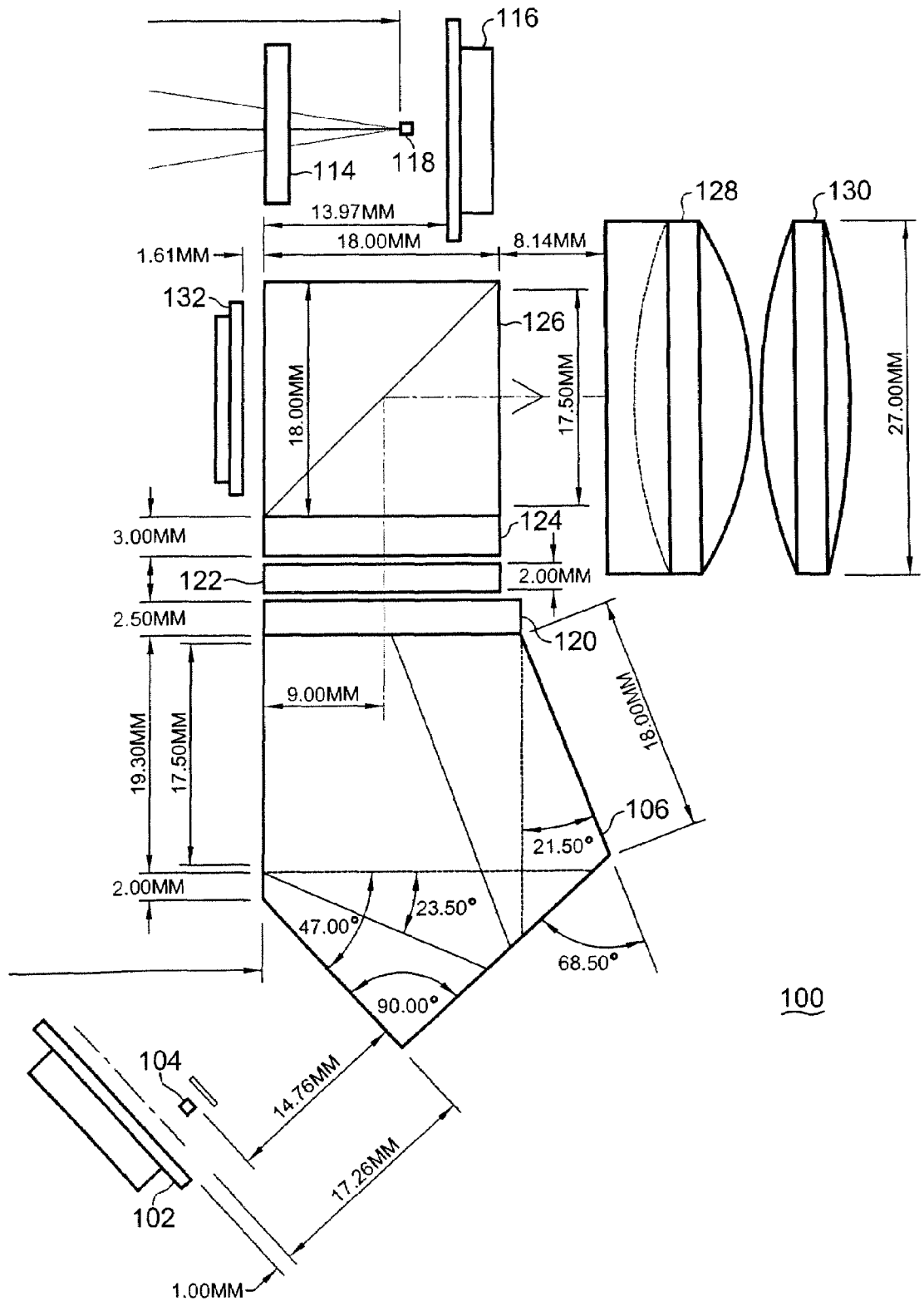
FIG. 3 illustrates, in greater detail, a diagrammatic illustration of portions of the representative embodiment of an optical system and beam pathway design of FIGS. 1A and 1B along with representative dimensions and relative positions thereof.

With reference additionally now to FIG. 3 a diagrammatic illustration of portions of the representative embodiment of an optical system and beam pathway design of FIGS. 1A and 1B is shown along with representative dimensions and relative positions thereof.

Figure 4:
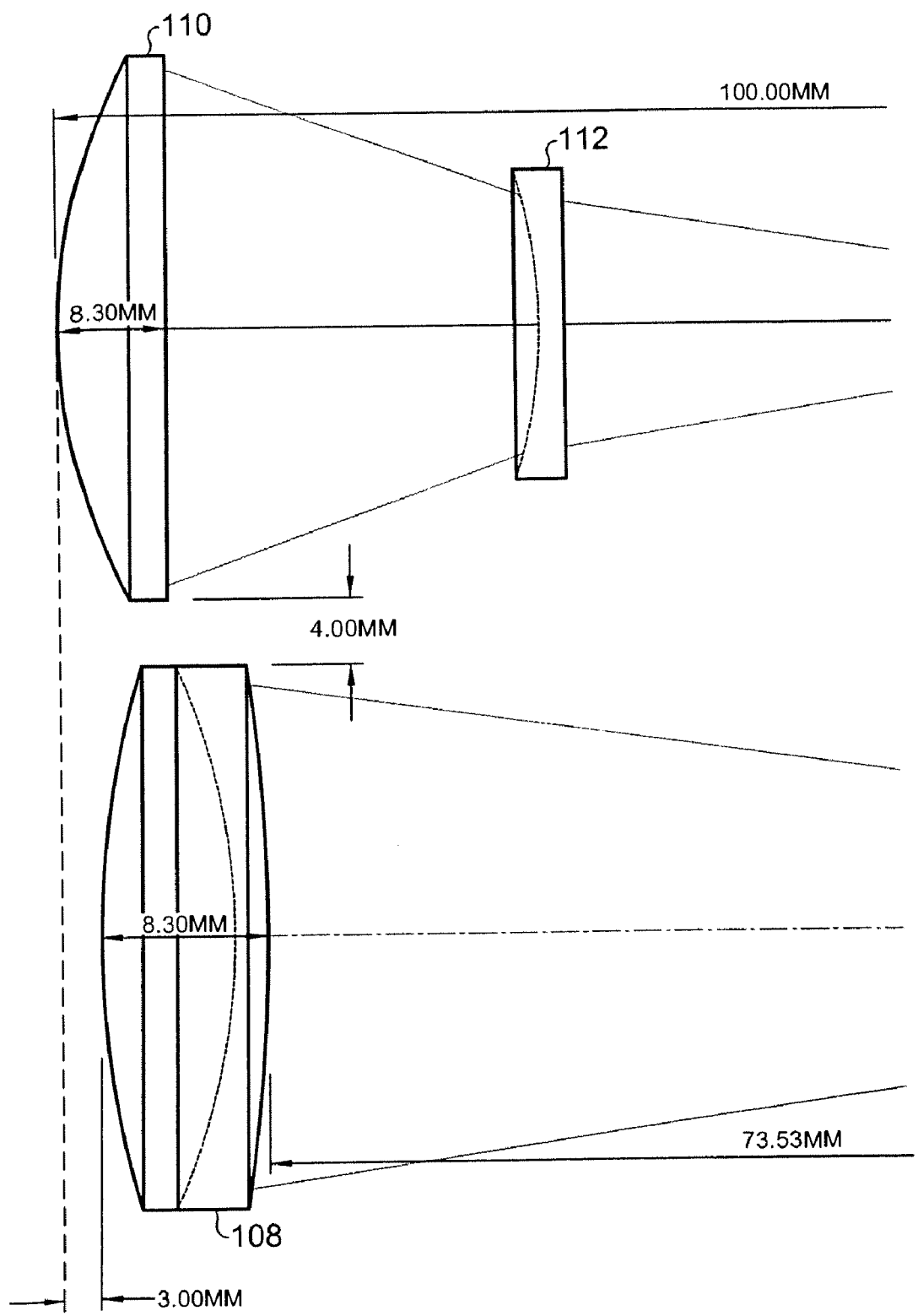
FIG. 4 illustrates, in greater detail, the beam transmission and reception lenses of FIGS. 1A and 1B along with the representative dimensions and relative positions thereof.

With reference additionally now to FIG. 4, the beam transmission and reception lenses 108 and 110 respectively of FIGS. 1A and 1B are shown along with the representative dimensions and relative positions thereof.

Figure 5:
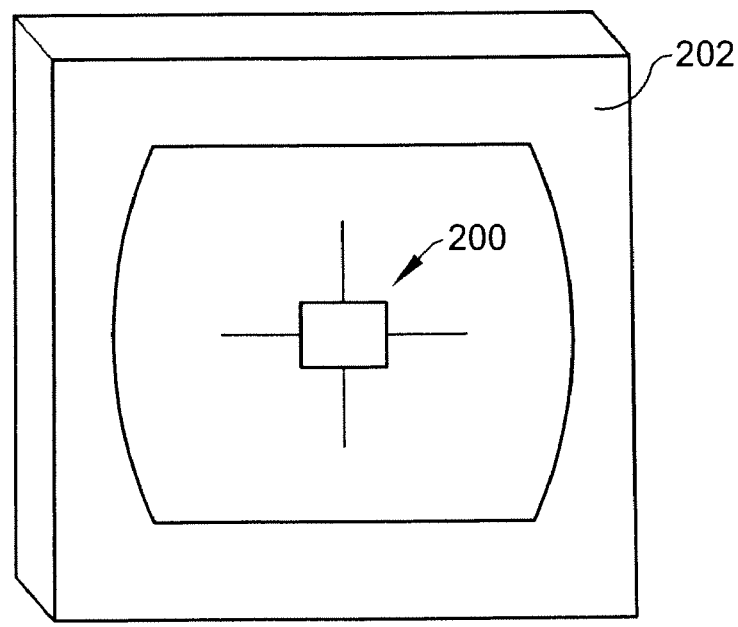
FIG. 5 is a simplified illustration of a possible arrangement of an aiming reticle and field stop for a representative in-sight display of information which may be provided to a user of a range-finding device incorporating the optical system and beam pathway of the present invention.

With reference additionally now to FIG. 5, a simplified illustration of a possible arrangement of an aiming reticle and field stop plate 122 for a representative in-sight display of information which may be provided to a user of a range-finding device incorporating the optical system and beam pathway of the present invention is shown. The aiming reticle and field stop plate 122 comprises, in pertinent part, an aiming reticle 200 (only one representative example of which is illustrated) etched or otherwise formed within a transparent or translucent substrate which is then covered substantially as shown with an inward-facing reflective coating 202 such as chrome or other suitable substance. The outward facing surface of the reflective coating 202 may be made black or other suitable dark color. The aiming reticle 200 may be formed in a surface of the substrate as a dispersive etch, etched and filled with a dispersive substance or by any other suitable method.

Functionally, light is trapped within the substrate by total internal reflection in conjunction with the reflective coating 202. In this way, and utilizing only ambient light received along the visual path 138, the reticle 200 will be effectively edge-illuminated and appear to a user to be black during daylight use when the target and surrounding areas are themselves well lit. At night, the reticle 200 will appear as white, green or other lighter color (depending on the substrate or filters utilized) and only a small amount of additional auxiliary illumination (and associated power consumption) may be required to make it stand out in contrast to the then darker appearing target and surrounding area.

Through this technique, a readily discernible reticle 200 is provided without the need for additional illumination sources or associated power consumption during daylight use, the latter in particular being important in a battery operated device. A rangefinding device in accordance with the present invention may conveniently employ a user-selectable day/night mode of operation and/or include a photosensitive sensor for automatically providing additional illumination for the reticle 200 when required.

Figure 6:
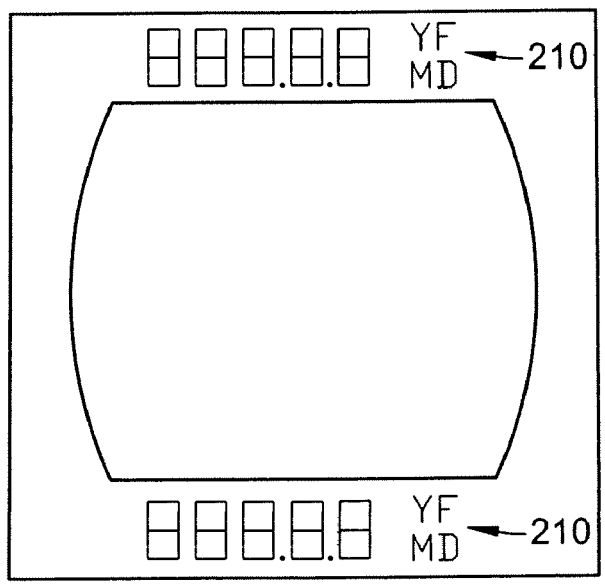
FIG. 6 is a simplified illustration of a representative in-sight display of information which may be provided to a user of a range-finding device incorporating the optical system and beam pathway of the present invention when viewed against the field stop of the preceding figure.
Figure 7A:
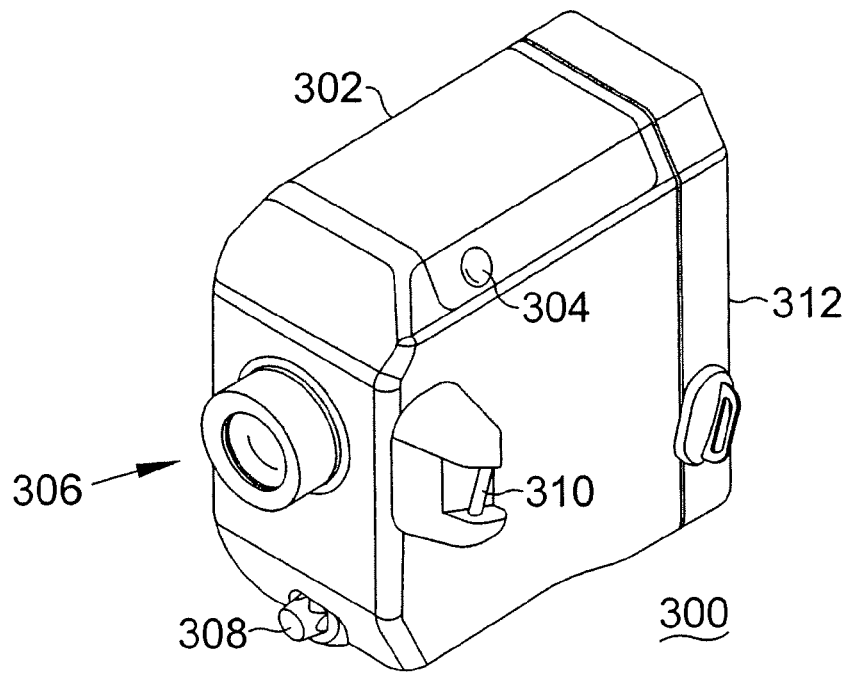
FIG. 7A is a rear isometric view of a possible physical implementation of a laser-based range-finding instrument incorporating the optical system and beam pathway of the present invention.
Figure 7B:
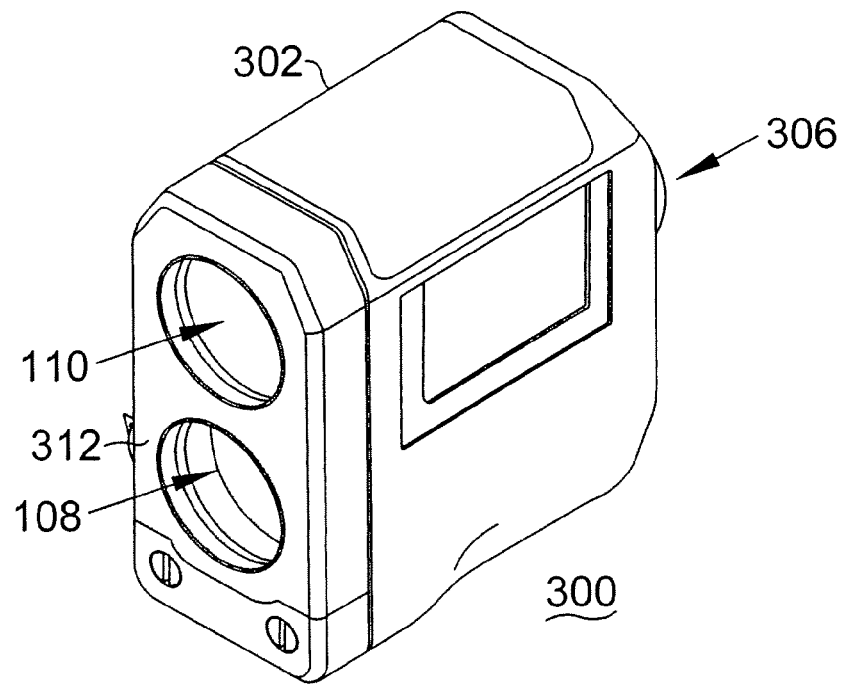
FIG. 7B is a further front isometric view of the representative range-finding instrument of FIG. 7A.
Figure 7C:
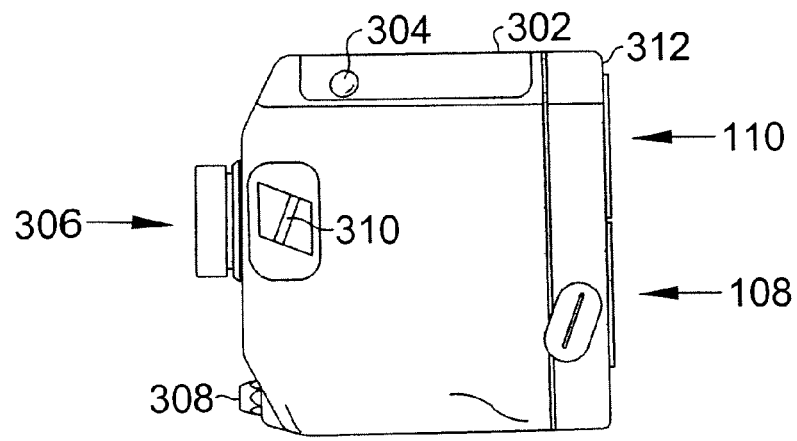
FIG. 7C is an additional side elevational view of the representative range-finding instrument of FIGS. 7A and 7B.
Figure 7D:
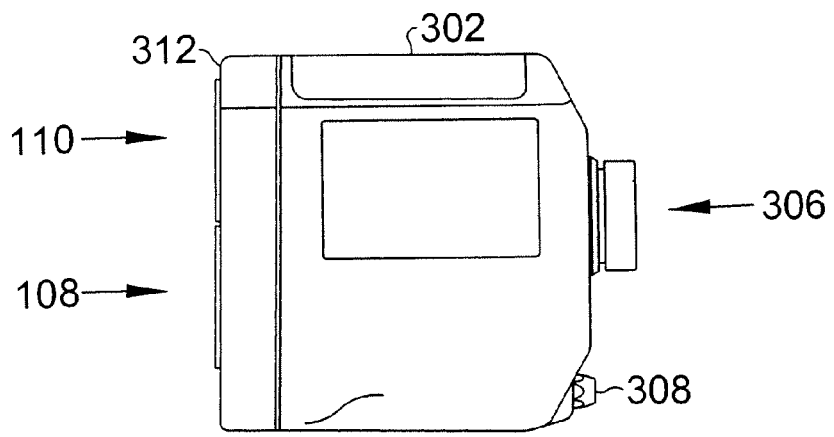
FIG. 7D is a opposite side elevational view of the representative range-finding instrument of FIGS. 7A through 7C inclusive.
Figure 7E:
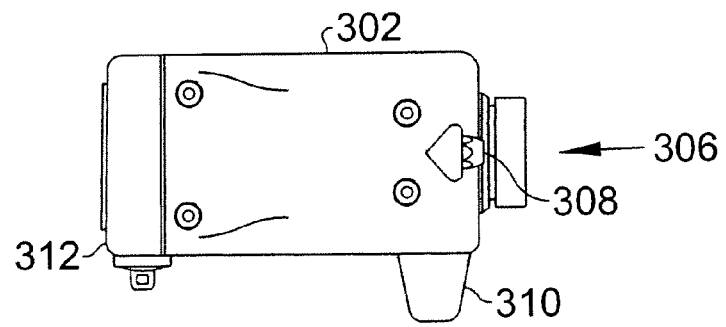
FIG. 7E is a bottom elevational view of the representative range-finding instrument of FIGS. 7A through 7D inclusive.

With reference additionally now to FIG. 6, a simplified illustration of a representative in-sight display (e.g. as presented by a back-lit LCD 132) of information which may be provided to a user of a range-finding device incorporating the optical system and beam pathway of the present invention is shown when viewed against the field stop of the preceding figure. The reflective surface 202 of the aiming reticle and field stop plate 122 is configured, in conjunction with the presentation of the LCD 132 such that range or other information 210 is superimposed upon the visually black appearing outline of the reflective surface to a viewer of a target through the lenses 128 and 130. This provides excellent visibility and contrast for the display of such information while utilizing only a very low-power consuming LCD display. It should be noted that, other types of display devices may be used in lieu of a back-lit LCD display as previously noted. A visible indication of yards, feet, meters, degrees and the like as well as other system 100 mode or ancillary target related data or information 210 may be displayed to the user superimposed on the reflective surface 202 and surrounding the visual image received along the visual path 138.

With reference additionally now to FIGS. 7A through 7E, respective rear isometric, front isometric, side elevational, opposite side elevational and bottom elevational views of a possible physical implementation of a laser-based rangefinding instrument 300 incorporating the optical system and beam pathway of the present invention are shown. The instrument 300 comprises, in pertinent part, a hand-held (or tripod-mountable) housing 302 and user actuatable beam "fire" and/or operational mode switch 304. An eyepiece 306 is placed to the user's eye to enable the instrument 300 to be used to identify, and be aimed at, a target to which range is to be determined and displayed on either on the display 132.

A convenient diopter adjustment wheel 308 also enables the user to pre-focus the visual path of the instrument 300 by altering the relative positions of the lenses 128 and 130 (FIGS. 1A and 1B) to his own particular eyesight requirements. A carrying strap for the instrument 300 (not shown) may be attached at location 310, while a battery for operating the instrument 300 may be made accessible through an access panel within a cover 312 in the front of the housing 302.

While a preferred embodiment of the method of the present invention includes the steps of emitting said beam toward a target along first and second non-collinear beam transmission paths, viewing said target along a visual path coincident with said second beam transmission path and at least a portion of said first beam transmission path, said visual path additionally comprising a further visual path and redirected visual path, and superimposing a visual display upon a view of said target, additional features are contemplated. For example, said redirected visual path may be derived from said further visual path by an at least partially reflective surface. Also, said at least partially reflective surface may include a beam splitter cube. Also, said step of superimposing a visual display may be carried out by a light emitting display, or in conjunction with a visual field stop, or by an LCD display, which may be back-lit. The method may further include the step of interposing an aiming reticle in said visual path, which step may be carried out by an etched translucent plate. The method may further include the step of receiving a reflection of said emitted beam from said target along a reception path substantially parallel to said second beam transmission path. The method may also include the step of positioning a beam receiving device on said reception path for detecting said reflection of said emitted beam, and said beam receiving device may include a laser receiving diode. The method may also include the step of positioning at least one lens within said reception aperture.

While there have been described above the principles of the present invention in conjunction with specific components and various arrangements thereof, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A system for a beam transmitting and receiving instrument comprising:
    a beam emitting device for producing an emitted beam along a first beam transmission path;
    a pentaprism for intercepting said emitted beam and producing a redirected beam for direction through a transmission aperture toward a target along a second beam transmission path;
    a visual path superimposed upon said second beam transmission path and at least a portion of said first beam transmission path for redirection by said pentaprism along a further visual path crossing said second beam transmission path; and
    an at least partially reflective surface disposed in said visual path for providing a redirected visual path such that a visual image of said target is presented at a visual aperture of said instrument along said redirected visual path.

2. The system of claim 1 further comprising a visual display viewable through said at least partially reflective surface and wherein said redirected visual path is parallel to but non-coincident with said visual path.

3. The system of claim 2 wherein said visual display comprises an LCD display or a back-lit LCD display.

4. The system of claim 2 wherein said visual display comprises a light emitting display.

5. The system of claim 4 wherein said light emitting display comprises a light emitting diode display.

6. The system of claim 2 wherein said at least partially reflective surface comprises a beam splitter for allowing an image of said visual display to at least partially pass through from said visual display to said visual aperture.

7. The system of claim 1 further comprising an aiming reticule.

8. The system of claim 7 wherein said aiming reticule is interposed in said further visual path of said instrument.

9. The system of claim 8 wherein said aiming reticule comprises an etched translucent plate.

10. The system of claim 9 wherein said etched translucent plate is at least partially peripherally surrounded by a reflective coating.

11. The system of claim 10 wherein said reflective coating comprises a field stop for said visual path.

12. The system of claim 7 wherein said aiming reticule may be selectively edge illuminated.

13. The system of claim 1 wherein said beam emitting device comprises a laser emitting diode.

14. The system of claim 13 wherein said laser emitting diode comprises an infrared laser emitting diode.

15. The system of claim 1 further comprising at least one lens positioned within said transmission aperture.

16. The system of claim 1 further comprising at least one lens positioned within said visual aperture.

17. The system of claim 1 further comprising a reception aperture for receiving a reflection of said emitted beam from said target along a reception path substantially parallel to said second beam transmission path.

18. The system of claim 17 further comprising a beam receiving device positioned on said reception path for detecting said reflection of said emitted beam.

19. The system of claim 18 wherein said beam receiving device comprises a laser receiving diode.

20. The system of claim 18 further comprising at least one lens positioned within said reception aperture.

21. The system of claim 20 wherein said at least one lens comprises an aspheric lens.

22. The system of claim 1 wherein said further visual path is substantially orthogonal to said second beam transmission path.

23. The system of claim 1 wherein said redirected visual path is substantially 90° to said further visual path.

* * * * *